(12) United States Patent
Hessling-Von Heimendahl

(10) Patent No.: US 11,492,139 B2
(45) Date of Patent: Nov. 8, 2022

(54) AIRCRAFT NAVIGATION LIGHT, COMBINATION OF AN AIRCRAFT NAVIGATION LIGHT AND A SUPPLEMENTAL EXTERIOR AIRCRAFT LIGHT, AND METHOD OF OPERATING AN EXTERIOR AIRCRAFT LIGHT

(71) Applicant: Goodrich Lighting Systems GmbH, Lippstadt (DE)

(72) Inventor: André Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 28 days.

(21) Appl. No.: 17/075,903

(22) Filed: Oct. 21, 2020

(65) Prior Publication Data

US 2021/0114747 A1   Apr. 22, 2021

(30) Foreign Application Priority Data

Oct. 22, 2019   (EP) .................................... 19204626

(51) Int. Cl.
*B64D 47/06* (2006.01)
*B60Q 1/00* (2006.01)
*B60Q 1/32* (2006.01)
*B60Q 1/46* (2006.01)
(Continued)

(52) U.S. Cl.
CPC ........... *B64D 47/06* (2013.01); *B60Q 1/0023* (2013.01); *B60Q 1/32* (2013.01); *B60Q 1/46* (2013.01); *B60Q 1/525* (2013.01); *B64D 41/00* (2013.01); *B64D 2203/00* (2013.01); *B64D 2221/00* (2013.01)

(58) Field of Classification Search
None
See application file for complete search history.

(56) References Cited

U.S. PATENT DOCUMENTS

| 4,117,454 A | 9/1978 | Fabry et al. |
|---|---|---|
| 5,293,304 A | 3/1994 | Godfrey |
| 6,963,293 B1 | 11/2005 | Rast |

(Continued)

FOREIGN PATENT DOCUMENTS

| EP | 3297404 A1 | 3/2018 |
|---|---|---|
| EP | 3572334 | * 11/2019 |

OTHER PUBLICATIONS

Extended European Search Report for International Application No. 19204626.6 dated Apr. 17, 2020, 8 pages.

*Primary Examiner* — Ashok Patel
(74) *Attorney, Agent, or Firm* — Cantor Colburn LLP

(57) ABSTRACT

An aircraft navigation light includes: a navigation lighting arrangement, having: a power input, couple able to an aircraft on-board power supply network, at least one navigation light source, and a power conditioning circuit, coupled between the power input and the at least one navigation light source for conditioning a power flow from the power input to the at least one navigation light source; an auxiliary power supply, coupled to the power conditioning circuit for diverting power from the navigation lighting arrangement; and a power supply output, coupled to the auxiliary power supply, for supplying power from the auxiliary power supply to an exterior aircraft light, external to the aircraft navigation light.

12 Claims, 5 Drawing Sheets

(51) Int. Cl.
*B60Q 1/50* (2006.01)
*B64D 41/00* (2006.01)

(56) References Cited

U.S. PATENT DOCUMENTS

| | | |
|---|---|---|
| 10,114,224 B2 | 10/2018 | Dewald et al. |
| 10,386,709 B2 | 8/2019 | Richards et al. |
| 2006/0285331 A1 | 12/2006 | Wang et al. |
| 2011/0019430 A1* | 1/2011 | Wilkinson ............ H05B 45/24 362/470 |
| 2018/0007327 A1 | 1/2018 | Richards et al. |
| 2018/0084620 A1* | 3/2018 | Klein .................... B64D 47/06 |

* cited by examiner

AIRCRAFT NAVIGATION LIGHT, COMBINATION OF AN AIRCRAFT NAVIGATION LIGHT AND A SUPPLEMENTAL EXTERIOR AIRCRAFT LIGHT, AND METHOD OF OPERATING AN EXTERIOR AIRCRAFT LIGHT

FOREIGN PRIORITY

This application claims priority to European Patent Application No. 19204626.6 filed Oct. 22, 2019, the entire contents of which is incorporated herein by reference.

TECHNICAL FIELD

The present invention is in the field of exterior aircraft lighting. In particular, the present invention relates to the power supply infrastructure of exterior aircraft lighting.

BACKGROUND

Almost all aircraft are equipped with exterior lighting systems. For example, large commercial aircraft have many different exterior lights. An exemplary group of exterior aircraft lights are lights for passive visibility and signalling, such as navigation lights and anti-collision lights. Another exemplary group of exterior aircraft lights are headlights that allow the pilots to view the area in front of them, when they are seated in the cockpit, such as taxi lights, take-off lights, landing lights, and runway turn-off lights. Yet another example of exterior aircraft lights are lights configured for illuminating portions of the ground below the aircraft and/or exterior surface portions of the aircraft. While a large variety of exterior aircraft lights has been developed and is in use, the range of lighting functions and/or the impact of the exterior aircraft lights on the aircraft design are not always considered satisfactory.

Accordingly, it would be beneficial to modify exterior aircraft lighting systems to facilitate an improved integration into the aircraft and/or an enhanced scope of lighting functions.

SUMMARY

Exemplary embodiments of the invention include an aircraft navigation light, comprising a navigation lighting arrangement, comprising a power input, coupleable to an aircraft on-board power supply network, at least one navigation light source, and a power conditioning circuit, coupled between the power input and the at least one navigation light source for conditioning a power flow from the power input to the at least one navigation light source; an auxiliary power supply, coupled to the power conditioning circuit for diverting power from the navigation lighting arrangement; and a power supply output, coupled to the auxiliary power supply, for supplying power from the auxiliary power supply to an exterior aircraft light, external to the aircraft navigation light.

Exemplary embodiments of the invention allow for an extension of the on-board power supply architecture at remote locations of the aircraft via an aircraft navigation light. The provision of the auxiliary power supply and the power supply output, fed from the auxiliary power supply, allow for adding an additional exterior aircraft light, without the need to install additional power lines along the wings of an aircraft or towards the tail of an aircraft. The aircraft navigation light, which is commonly arranged locations quite remote from the center of the aircraft, such as at the wing tips of the wings or the tail of the fuselage, provides for an extension of the aircraft on-board power supply network. The aircraft navigation light may also be characterized as an aircraft navigation light with integrated local power supply to an additional exterior aircraft light. The additional exterior aircraft light may provide additional lighting functionality, without considerably adding to the power wiring throughout the aircraft. Also, as compared to including additional lighting functionality into the aircraft navigation light itself and as compared to diverting power from the aircraft on-board power supply network before being supplied to the aircraft navigation light, exemplary embodiments of the invention allow for keeping the navigation lighting functionality untouched, thus eliminating the need for a deep re-design of the aircraft navigation light and/or eliminating the need for additional certification by air traffic authorities and/or aircraft manufacturers.

The at least one navigation light source may be at least one LED. With LEDs being small, reliable, and low power light sources, a particularly compact, reliable, and power efficient implementation of the aircraft navigation light may be achieved.

The power conditioning circuit may comprise an electromagnetic interference filter and/or an isolated power factor correction circuit. In addition, the power conditioning circuit may have a light source control circuit, in particular an LED control circuit. Such LED control circuit may be configured to provide a suitable illumination current to the at least one LED.

The diversion of electrical power to the auxiliary power supply may take place at any suitable point throughout the power conditioning circuit. In particular, the auxiliary power supply may be coupled to the power conditioning circuit in between a power input side, comprising an electromagnetic interference filter and/or an isolated power factor correction circuit, and a light source control circuit. The coupling between the power conditioning circuit and the auxiliary power supply may allow for uni-directional power flow only, such as via the provision of a diode.

The auxiliary power supply may be an instantaneous power supply, passing on power as diverted from the navigation lighting arrangement, potentially after some power conditioning, or may comprise a power storage element, such as a capacitor or a rechargeable battery, for harvesting power from the navigation lighting arrangement for later use.

The power supply output is an external terminal of the aircraft navigation light. The exterior aircraft light, to be connected to the power supply output, may be coupled to the power supply output via a suitable power line or connector.

According to a further embodiment, the auxiliary power supply is galvanically isolated from the power input of the navigation lighting arrangement. In this way, the auxiliary power supply is effectively protected from undesired influences, stemming from the aircraft on-board power supply network. The aircraft on-board power supply network may be an AC power supply network, in particular a 115 V AC power supply network. The auxiliary power supply may be a DC power supply. Also, DC power may be supplied at the power supply output.

According to a further embodiment, the power supply output is coupled to the auxiliary power supply via a controller, and the controller is configured to selectively enable power flow from the auxiliary power supply to the power supply output. In this way, the control of the additional exterior aircraft light, coupled to the power supply output, may be integrated into the aircraft navigation light. With the power supply and the control of the additional exterior aircraft light being integrated into the aircraft navigation light, the additional exterior aircraft light may have a comparably basic design and provide for additional lighting functionality in a with comparably low complexity. The controller may be configured to switch the power flow to the power supply output on/off. The controller may also be able to implement more complex power flow patterns.

According to a further embodiment, the controller is configured to selectively enable power flow from the auxiliary power supply to the power supply output depending on an operational status of the navigation lighting arrangement. For example, the controller may enable power flow from the auxiliary power supply to the power supply output, in case there is a power flow through the power conditioning circuit and/or in case the at least one navigation light source is providing a light output and/or in case other conditions in the navigation lighting arrangement are met. In this way, power supply to the additional exterior aircraft light via the power supply output may take into account the primary operation of the aircraft navigation light. The power supply to the additional exterior aircraft light may be configured not to interfere with said primary function.

According to a further embodiment, the aircraft navigation light further comprises a status signal input for receiving information about an operational status of an anti-collision lighting system of the aircraft, wherein the controller is configured to selectively enable power flow from the auxiliary power supply to the power supply output depending on the operation status of the anti-collision lighting system of the aircraft. The operational status of the anti-collision lighting system may be considered an indicator whether the aircraft is on the ground and being boarded/de-boarded/serviced or whether the aircraft is on the ground, rolling on the airfield, or whether the aircraft is in the air. The operational status of the anti-collision lighting system of the aircraft may coarsely indicate the current operating mode of the aircraft, thus allowing for the exterior aircraft light, coupled to the power supply output of the aircraft navigation light, to be operated in accordance therewith. For example, on the basis of the operational status of the anti-collision lighting system of the aircraft, power may be supplied to the additional exterior aircraft light via the power supply output, in case the aircraft is determined to be on the ground. It is also possible that changes in the operational status of the anti-collision lighting system of the aircraft trigger a timer and that power flow to the additional exterior aircraft light will be started/stopped after the expiration of the timer.

The information about the operational status of the anti-collision lighting system of the aircraft may be received directly from the anti-collision lighting system, such as from a white flashing strobe light or from a red flashing beacon light of the anti-collision lighting system. It is also possible that a command signal, as received by such white flashing strobe lights or red flashing beacon lights, is received at the status signal input. The command signal may also be considered to contain information about the operational status of the anti-collision lighting system, assuming that the anti-collision lighting system operates in accordance with said command signal.

According to a further embodiment, the controller is configured to enable power flow to the power supply output in case the red flashing beacon lights of the anti-collision lighting system are on; and/or in case the white flashing strobe lights of the anti-collision lighting system are off; and/or in case the red flashing beacon lights and the white flashing strobe lights of the anti-collision lighting system are off. The white flashing strobe lights being off is a good indication that the aircraft is on the ground. The red flashing beacon lights being on is a good indication that the aircraft is on the move and is not currently being boarded/de-boarded/serviced. The red flashing beacon lights and the white flashing strobe lights being off is a good indication that the airplane is currently being boarded/de-boarded/serviced or even terminally parked, e.g. for the night.

According to a further embodiment, the aircraft navigation light further comprises a temperature sensor and/or a light output sensor, wherein the controller is coupled to the temperature sensor and/or the light output sensor and configured to monitor the operation of the at least one navigation light source via the temperature sensor and/or the light output sensor. In this way, the controller integrates the function of controlling power flow from the auxiliary power supply to the power supply output of the aircraft navigation light and the functionality of monitoring the primary operation of the aircraft navigation light by monitoring an operating temperature and/or a navigation light output. The temperature sensor and/or the light output sensor may be arranged in proximity to the at least one navigation light source, in particular on the same circuit board as the at least one navigation light source.

According to a further embodiment, the aircraft navigation light further comprises a second navigation lighting arrangement, comprising a second power input, coupleable to the aircraft on-board power supply network, at least one second navigation light source, and a second power conditioning circuit, coupled between the second power input and the at least one second navigation light source for conditioning a power flow from the second power input to the at least one second navigation light source; wherein the auxiliary power supply is coupled to the second power conditioning circuit for diverting power from the second navigation lighting arrangement. In this way, both the provision of the navigation lighting functionality as well the feeding of power from the aircraft on-board power supply network to the auxiliary power supply are implemented in a redundant manner. This in turn allows for both the navigation lighting functionality and the provision of power to the additional exterior aircraft light via the power supply output to still work, should one of the navigation lighting arrangement and the second navigation lighting arrangement fail.

According to a further embodiment, the aircraft navigation light is a right wing tip aircraft navigation light or a left wing tip aircraft navigation light. Providing the auxiliary power supply and the power supply output to an additional exterior aircraft light in a wing tip region of the aircraft is particularly beneficial, because those regions are very remote from the aircraft fuselage and are otherwise hard to supply with additional power. Also, with the right wing tip aircraft navigation light or the left wing tip aircraft navigation light enabling the installation of an additional exterior aircraft light, beneficial supplemental functions, such as illuminating the wing tip of the aircraft and/or illuminating a ground portion underneath the wing tip of the aircraft, may be achieved. In this way, an extension of the aircraft on the airfield may be effectively indicated and signaled to other aircraft/ground personnel. Also, illuminating the wing tip may allow for a better identification of the aircraft, e.g. via projecting or illuminating an airline logo.

Exemplary embodiments of the invention further include a combination of an aircraft navigation light and a supplemental exterior aircraft light, wherein the aircraft navigation light is embodied in accordance with any of the embodiments described above and wherein the supplemental exterior aircraft light is coupled to the power supply output of the aircraft navigation light for receiving power from the auxiliary power supply of the aircraft navigation light. In this way, the navigation lighting functionality and the additional lighting functionality of the supplemental exterior aircraft light may be implemented via two separate light units, while only requiring one connection to the aircraft on-board power supply network. With this modular set-up, each of the aircraft navigation light and the supplemental exterior aircraft light may be replaced individually, should maintenance be required or another reason for replacement arise. Also, the supplemental exterior aircraft light may be easily adapted in functionality and/or upgraded, without having to temper with the aircraft navigation light in any way. The additional features, modifications, and effects, as described above with respect to the aircraft navigation light, apply to the combination of the aircraft navigation light and the supplemental exterior aircraft light in an analogous manner.

The term supplemental exterior aircraft light may refer to an exterior aircraft light that provides additional exterior aircraft lighting functionality, as compared to the navigation lighting functionality provided by the aircraft navigation light. The supplemental exterior aircraft light may in particular provide lighting functionality that is not required by aircraft regulations, such as anti-collision lighting functionality, but provides lighting functionality that enhances the exterior aircraft lighting system beyond what is required by the regulations, such as the Federal Aviation Regulations (FAR). The supplemental exterior aircraft light is herein also referred to as additional exterior aircraft light or just exterior aircraft light.

According to a further embodiment, the supplemental exterior aircraft light is configured to be installed on an aircraft for illuminating at least one of a ground portion below the aircraft and an exterior surface portion of the aircraft. The exterior surface portion of the aircraft may in particular be a portion of the aircraft fuselage or a portion of an aircraft wing, such as a substantially vertical wing tip of the aircraft.

According to a further embodiment, the supplemental exterior aircraft light is an exterior aircraft image projector, configured to be installed on an aircraft for projecting an image onto at least one of a ground portion below the aircraft and an exterior surface portion of the aircraft. The provision of the image via the exterior aircraft image projector may convey signaling information to the passengers and/or ground personnel and/or crew members. For example, the projection of the image to a ground portion below the aircraft may help in recognizing the extension of the aircraft on the airfield, for example when provided on a ground portion underneath the wing/wing tip of the aircraft or underneath the tail of the aircraft, thus helping drivers of ground vehicles to navigate around the aircraft. Also, the image may contain information about the particular aircraft. For example, the projection of an airline logo onto a ground portion or onto an exterior surface portion of the aircraft may help passengers and/or ground personnel and/or crew members in identifying the aircraft, thus helping in facilitating a smooth servicing and/or boarding and/or de-boarding of the aircraft.

According to a further embodiment, the exterior aircraft image projector is installed on the aircraft outer structure. This may allow for an easy installation and maintenance of the exterior aircraft image projector. In particular, the exterior aircraft image projector may be installed on an inside of an outer skin of the aircraft, so that the outer skin of the aircraft protects the exterior aircraft image projector from adverse ambient conditions, such as water and/or dirt and/or aerodynamic forces. The exterior aircraft image projector may, in operation, project a light beam through a lens cover, which is part of the aircraft outer structure, in particular part of the outer skin of the aircraft.

The projected image may be of a single color, including white color. It is also possible that the projected image comprises multiple colors.

Exemplary embodiments of the invention further include an aircraft, comprising a combination of an aircraft navigation light and a supplemental exterior aircraft light, as described in any of the embodiments above. The additional features, modifications, and effects, as described above with respect to the aircraft navigation light and with respect to the combination of an aircraft navigation light and a supplemental exterior aircraft light, apply to the aircraft in an analogous manner.

According to a further embodiment, the aircraft is an air plane and the combination of the aircraft navigation light and the supplemental exterior aircraft light is installed in a wing tip region of a wing of the air plane. In particular, the air plane may have two such combinations, installed in the wing tip regions of the left wing and the right wing of the air plane.

Exemplary embodiments of the invention further include a method of operating an exterior aircraft light, installed in an aircraft adjacent to an aircraft navigation light, the method comprising: receiving power from a power supply output of the aircraft navigation light; and illuminating at least one of a ground portion below the aircraft and an exterior surface portion of the aircraft in response to receiving power from the aircraft navigation light. The additional features, modifications, and effects, as described above with respect to the aircraft navigation light and the combination of an aircraft navigation light and a supplemental exterior aircraft light, apply to the method of operating an exterior aircraft light in an analogous manner.

According to a further embodiment, the method of operating an exterior aircraft light is a method of operating an exterior aircraft image projector, and the step of illuminating at least one of a ground portion below the aircraft and an exterior surface portion of the aircraft includes projecting an image onto at least one of a ground portion below the aircraft and an exterior surface portion of the aircraft.

The exterior aircraft light being installed adjacent to the aircraft navigation light means, on the one hand, that the exterior aircraft light and the aircraft navigation light are separate modules or units, coupled e.g. via a power line between the power supply output of the aircraft navigation light and the exterior aircraft light. The adjacent installation means, on the other hand, that the exterior aircraft light and the aircraft navigation light are arranged in the vicinity of each other in the context of the overall aircraft extension. For example, the distance between the exterior aircraft light and the aircraft navigation light may be less than 2 m, in particular less than 1 m, further in particular between 10 cm and 50 cm.

According to a further embodiment, the method further comprises: evaluating an operational status of an anti-collision lighting system of the aircraft; and selectively illuminating said at least one of the ground portion below the aircraft and the exterior surface portion of the aircraft, depending on the operational status of the anti-collision lighting system of the aircraft. The evaluating of the operational status of the anti-collision lighting system and the decision on whether or not to illuminate said at least one of the ground portion below the aircraft and the exterior surface portion of the aircraft via the exterior aircraft light may be carried out within the exterior aircraft light or outside of the exterior aircraft light, such as at the aircraft navigation light or at another instance within the exterior lighting system of the aircraft.

According to a further embodiment, the evaluating of the operational status of the anti-collision lighting system of the aircraft comprises deriving, from the operational status of the anti-collision lighting system of the aircraft, whether the aircraft is on the ground.

BRIEF DESCRIPTION OF THE DRAWINGS

Further exemplary embodiments of the invention will be described below with respect to the accompanying drawings, wherein.

DETAILED DESCRIPTION

Figure 1:
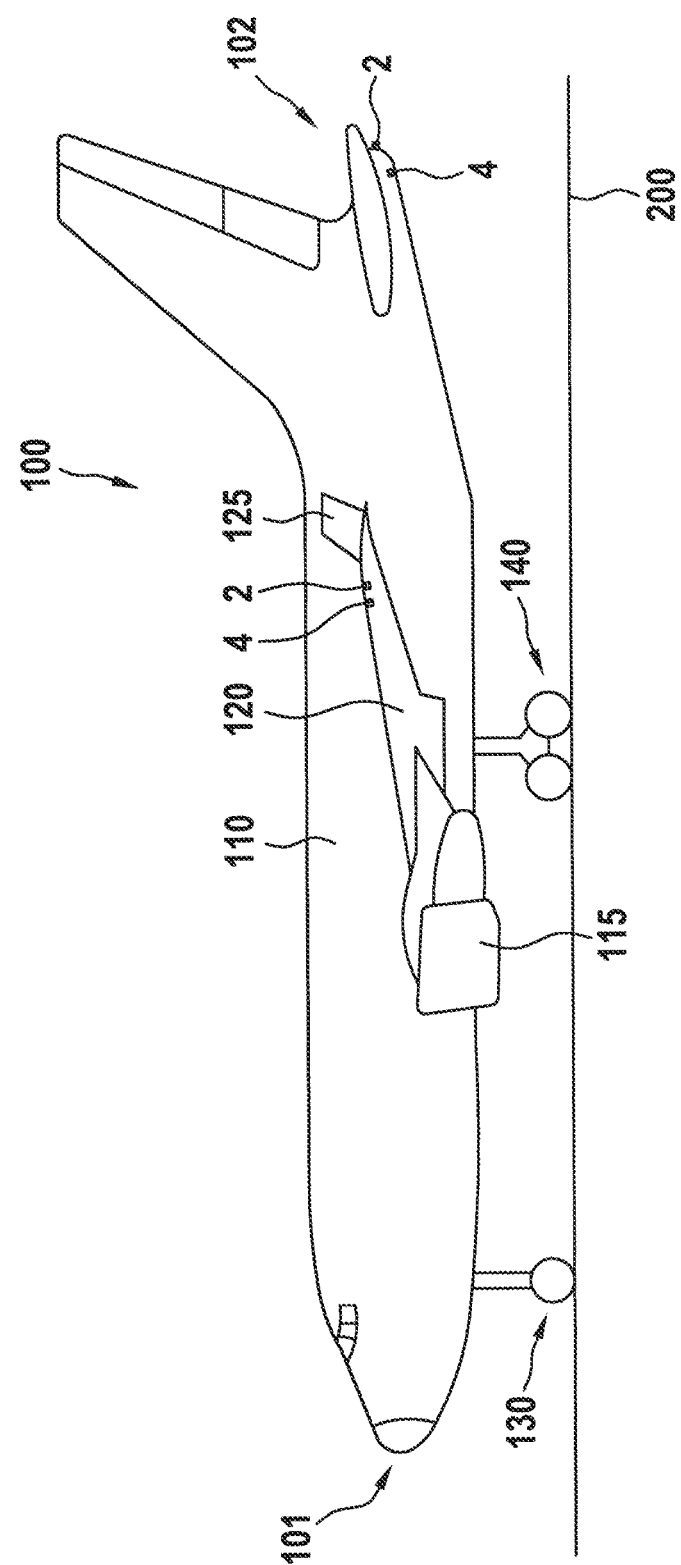
FIG. 1 shows a schematic side view of an aircraft in accordance with an exemplary embodiment of the invention, the aircraft being equipped with aircraft navigation lights in accordance with exemplary embodiments of the invention and associated supplemental exterior aircraft lights.
Figure 2:
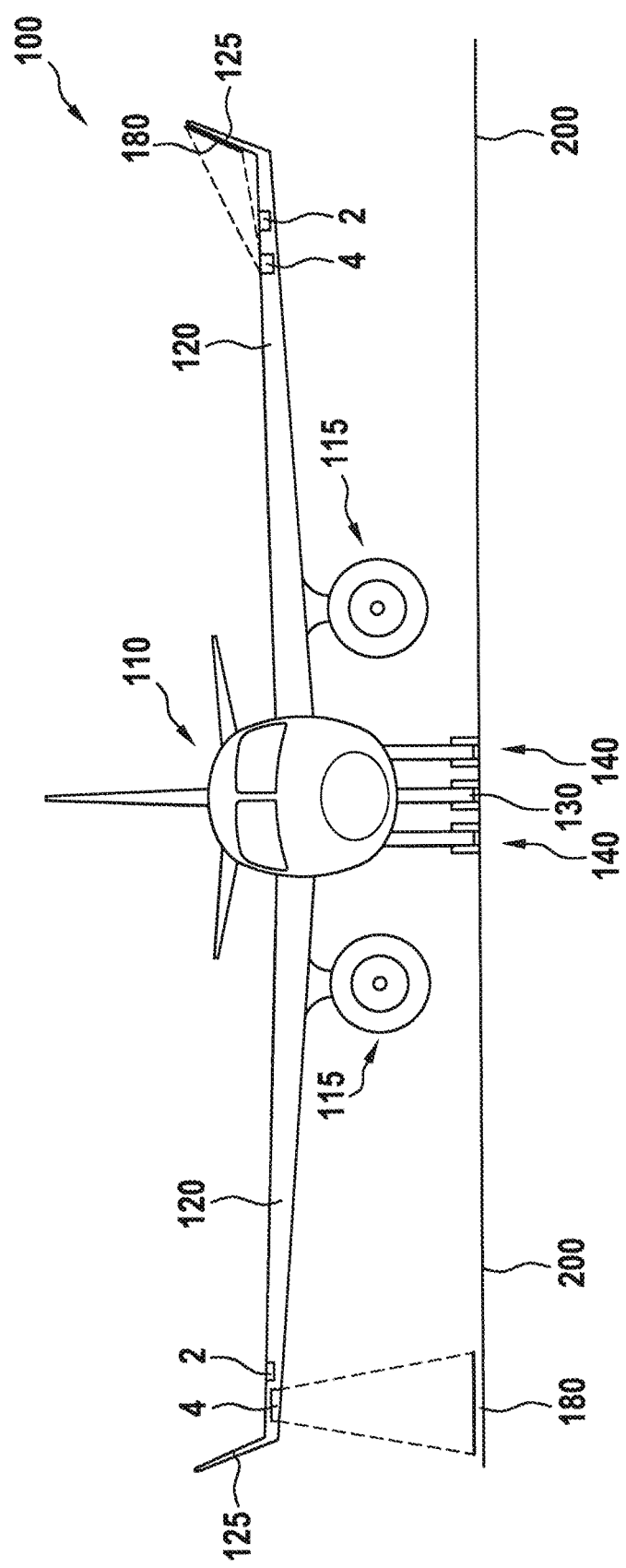
FIG. 2 shows a schematic front view of the aircraft depicted in FIG. 1.

FIG. 1 shows a schematic side view of an aircraft 100 in accordance with an exemplary embodiment of the invention. In the exemplary embodiment of FIG. 1, the aircraft is a large commercial passenger air plane. FIG. 2 shows a schematic front view of the aircraft 100, depicted in FIG. 1.

The aircraft 100, depicted in FIGS. 1 and 2, is resting on a ground 200, such as a runway, a taxi way, an airport ramp, or a ground portion next to a gate. The aircraft 100 has a fuselage 110, extending from a tip 101 of the aircraft to a tail 102 of the aircraft, two wings 120, extending laterally from the fuselage 110, a front gear 130 and two main gears 140. Each of the left and right wings 120 supports an engine 115. Only the left one of the wings 120, the engines 115 and the main gears 140 is visible in the side view of FIG. 1.

The aircraft 100 is equipped with multiple aircraft navigation lights 2. In particular, the aircraft 100 has a left aircraft navigation light 2, arranged in a wing tip region of the left wing 120 of the aircraft 100, a right aircraft navigation light 2, arranged in a wing tip region of the right wing 120 of the aircraft 100, and a tail aircraft navigation light 2, arranged at the tail 102 of the aircraft. In the exemplary embodiment of FIGS. 1 and 2, each of the aircraft navigation lights 2 is embodied in accordance with an exemplary embodiment of the invention. It is also possible that only one of the aircraft navigation lights 2 or two of the aircraft navigation lights 2, in particular the left and right aircraft navigation lights 2, are embodied in accordance with exemplary embodiments of the invention.

In the exemplary embodiment of FIGS. 1 and 2, each of the aircraft navigation lights 2 is associated with an exterior aircraft image projector 4. An exterior aircraft image projector 4 is an example of a supplemental exterior aircraft light, coupled to the aircraft navigation light 2, as will be explained below. Supplemental exterior aircraft lights, associated with aircraft navigation lights 2, may also be referred to as additional exterior aircraft lights or just exterior aircraft lights herein.

In the exemplary embodiment of FIGS. 1 and 2, the left aircraft navigation light 2, which is shown to the right in FIG. 2, is associated with an exterior aircraft image projector 4, which is arranged and configured to project an image 180 onto the inside of a left wing tip 125 of the left wing 120. In the depicted exemplary embodiment, the image 180 is an airline logo, helping the ground personnel in identifying the aircraft 100 and helping in gauging the extension of the aircraft 100 from afar. The exterior aircraft image projector 4 is arranged on an upper side of the left wing 120 and is arranged in the vicinity of and towards the lateral inside of the left aircraft navigation light 2. It is understood that the exterior aircraft image projector 4 may be arranged somewhat closer or farther from the aircraft navigation light and may also be arranged laterally outside thereof, depending on the set-up and directivity of its light output.

It is understood that, instead of an exterior aircraft image projector, another kind of exterior aircraft light may be used. For example, a plain white illumination of the wing tip 125 may be achieved via another kind of exterior aircraft light. In case an airline logo is painted on the wing tip 125, such white illumination may have a similar effect as the projection of an airline logo onto the inside of the wing tip 125.

The right aircraft navigation light 2 is also associated with an exterior aircraft image projector 4. This exterior aircraft image projector 4 is arranged and configured to project an image 180 onto a portion of the ground 200 underneath the aircraft 100, in particular underneath a wing tip region of the right wing 120 of the aircraft 100. The exterior aircraft image projector 4 may project an airline logo to the ground portion underneath the right wing 120. It is also possible that the exterior aircraft image projector 4 projects a warning image, such as a yellow do-not-enter-zone image onto the ground 200. In this way, the exterior aircraft image projector 4 may allow for an effective indication of the position of the wing tip region of the aircraft 100, thus helping drivers of ground vehicles to avoid collisions with the aircraft 100. Instead of this exterior aircraft image projector 4, a warning light, emitting a more plain warning light output towards ground, such as a cone of yellow or orange or red light, may be employed as well.

It is further understood that the description of two different exterior aircraft image projectors 4 on the left and right wings 120 of the aircraft 100 is for illustrative purposes only. It is possible that both wings 120 have a symmetric design. In particular, each of the left and right aircraft navigation lights 2 may be combined with an exterior aircraft image projector 4/other exterior aircraft light for illuminating the respective wing tip and/or for illuminating another exterior surface portion of the aircraft 100. In addition/alternatively, each of the left and right aircraft navigation lights 2 may be combined with an exterior aircraft image projector 4/other exterior aircraft light for illuminating a portion of the ground 200 underneath the aircraft 100.

Both of the exterior aircraft image projectors 4, as depicted in FIG. 2, receive their operating power from the adjacent aircraft navigation lights 2. In this way, the exterior aircraft image projectors 4 do not need individual connections to the aircraft on-board power supply network. The details of the provision of electric power from the aircraft navigation light 2 to the exterior aircraft image projectors 4 will be described below with respect to FIG. 5.

Figure 3:
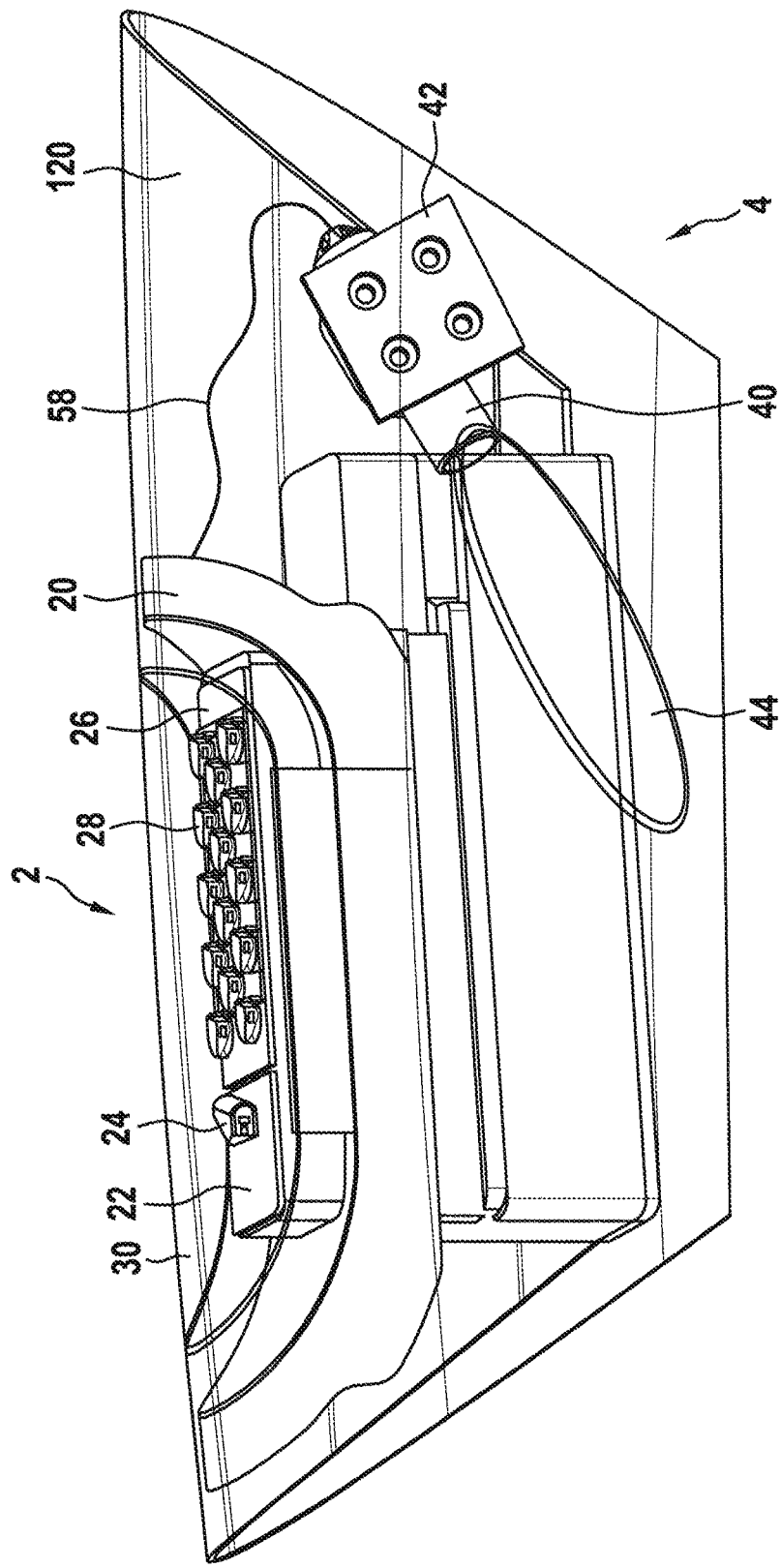
FIG. 3 shows a schematic perspective view of a portion of a left wing tip region of an aircraft, with a combination of an aircraft navigation light and an exterior aircraft image projector in accordance with an exemplary embodiment of the invention being installed in the depicted left wing tip region.

FIG. 3 shows a schematic perspective top view of a portion of the wing tip region of the left wing 120 of an aircraft in accordance with an exemplary embodiment of the invention. The front edge of the wing 120 is depicted towards the top in the drawing plane of FIG. 3. The depicted portion of the left wing 120 is towards the inside of the upwards bent wing tip, i.e. in the more or less horizontal part of the left wing 120.

An aircraft navigation light 2 and an exterior aircraft image projector 4 are installed in the depicted portion of the wing 120. The exterior aircraft image projector 4 is coupled to the aircraft navigation light 2 via a power connection 58, also referred to as power line 58 herein. In operation, the exterior aircraft image projector 4 receives power from the aircraft navigation light 2 via said power connection 58, as will be described in detail below.

In the exemplary embodiment of FIG. 3, the aircraft navigation light 2 is a combined navigation and white strobe anti-collision light. In general, the term aircraft navigation light, as described herein, is meant to encompass aircraft light units that have aircraft navigation functionality, irrespective of whether or not additional functionality is included in such light units. Accordingly, the combined navigation and white strobe anti-collision light of FIG. 3 is considered a particular implementation of an aircraft navigation light.

The aircraft navigation light 2 has a housing 20 which is arranged to the inside of the skin of the wing 120. The aircraft navigation light 2 further comprises a navigation light circuit board 22, to which a first navigation light source and a second navigation light source are mounted. An optical system 24, which is a lens in the exemplary embodiment of FIG. 3, is supported by the navigation light circuit board 22 and arranged over the first and second navigation light sources for shaping the navigation light output. The aircraft navigation light 2 further comprises an anti-collision light circuit board 26, which supports fourteen combinations of an anti-collision light source and an associated lens 28 for shaping the anti-collision light output. The fourteen anti-collision light sources jointly provide a high intensity flashing white anti-collision light output in the exemplary embodiment of FIG. 3.

The aircraft navigation light 2 further comprises a lens cover 30 for closing the aircraft navigation light 2 with respect to the environment of the aircraft. The navigation light circuit board 22 and the anti-collision light circuit board 26 are arranged between the housing 20 and the lens cover 30, in particular mounted to the housing 20 via a suitable console.

The exterior aircraft image projector 4 has a projection module 40, which is mounted to an inside of the skin of the wing 120 via a mounting structure 42. The projection module 40, in operation, projects a light beam through a lens cover 44, arranged in the skin of the wing 120. In the exemplary embodiment of FIG. 3, the lens cover 44 is arranged on an upper side of the wing 120, such that the projector 40 can project an image onto the wing tip of the wing 120 in operation.

Figure 4:
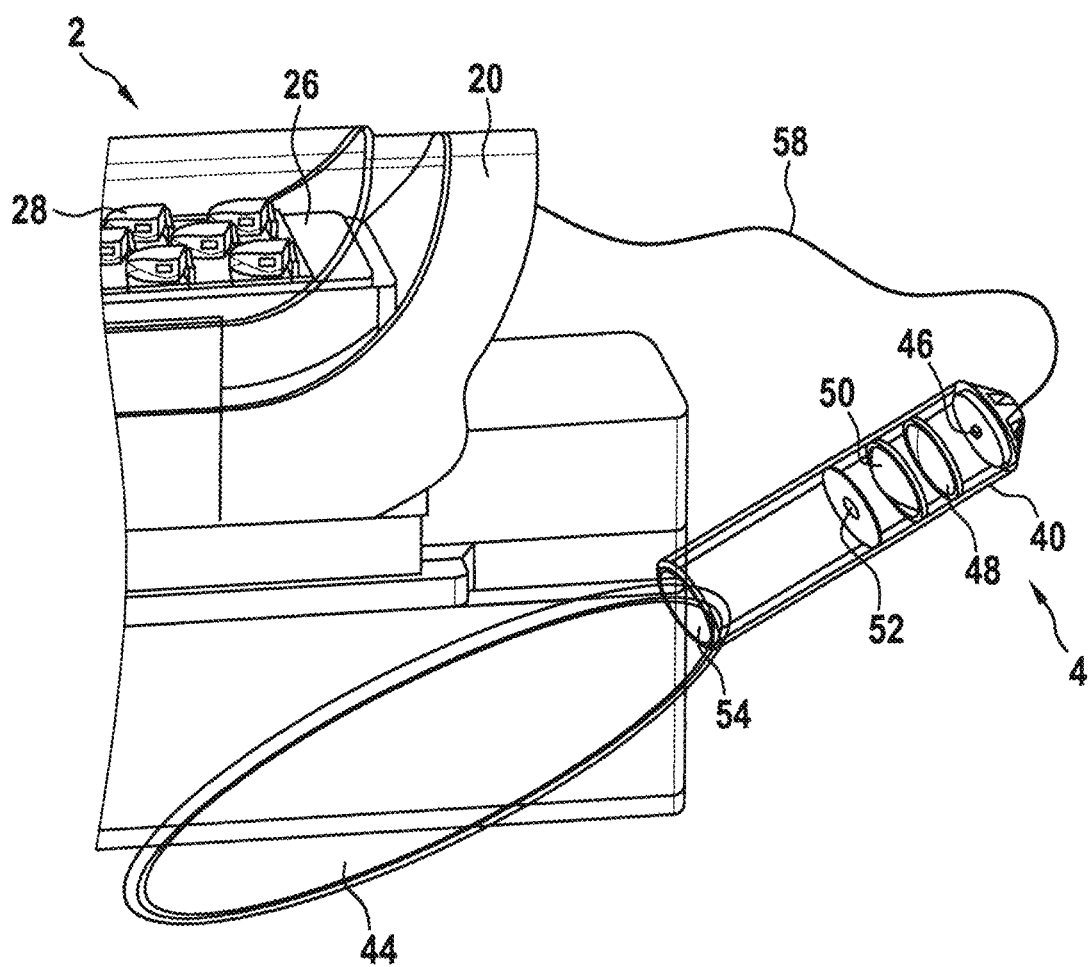
FIG. 4 shows an enlarged portion of the combination depicted in FIG. 3, with the exterior aircraft image projector being shown in a partially cut-open view.

FIG. 4 shows an enlarged portion of the combination of the aircraft navigation light 2 and the exterior aircraft image projector 4 of FIG. 3. In the enlarged view of FIG. 4, the mounting structure 42 of the exterior aircraft image projector is omitted, and the projection module 40 is shown in a cut-open view for illustrating the optical system arranged therein.

The projection module 40 of the exterior aircraft image projector 4 comprises a light source 46, which may be an LED or a group of LEDs. The projection module 40 further comprises, in the direction of light propagation, a biconvex lens 48, a planoconvex lens 50, a slide carrying the airline logo 52, and another planoconvex lens 54. With these optical elements, the light from the light source 46 may be transformed into a light beam that projects the airline logo onto the wing tip.

Figure 5:
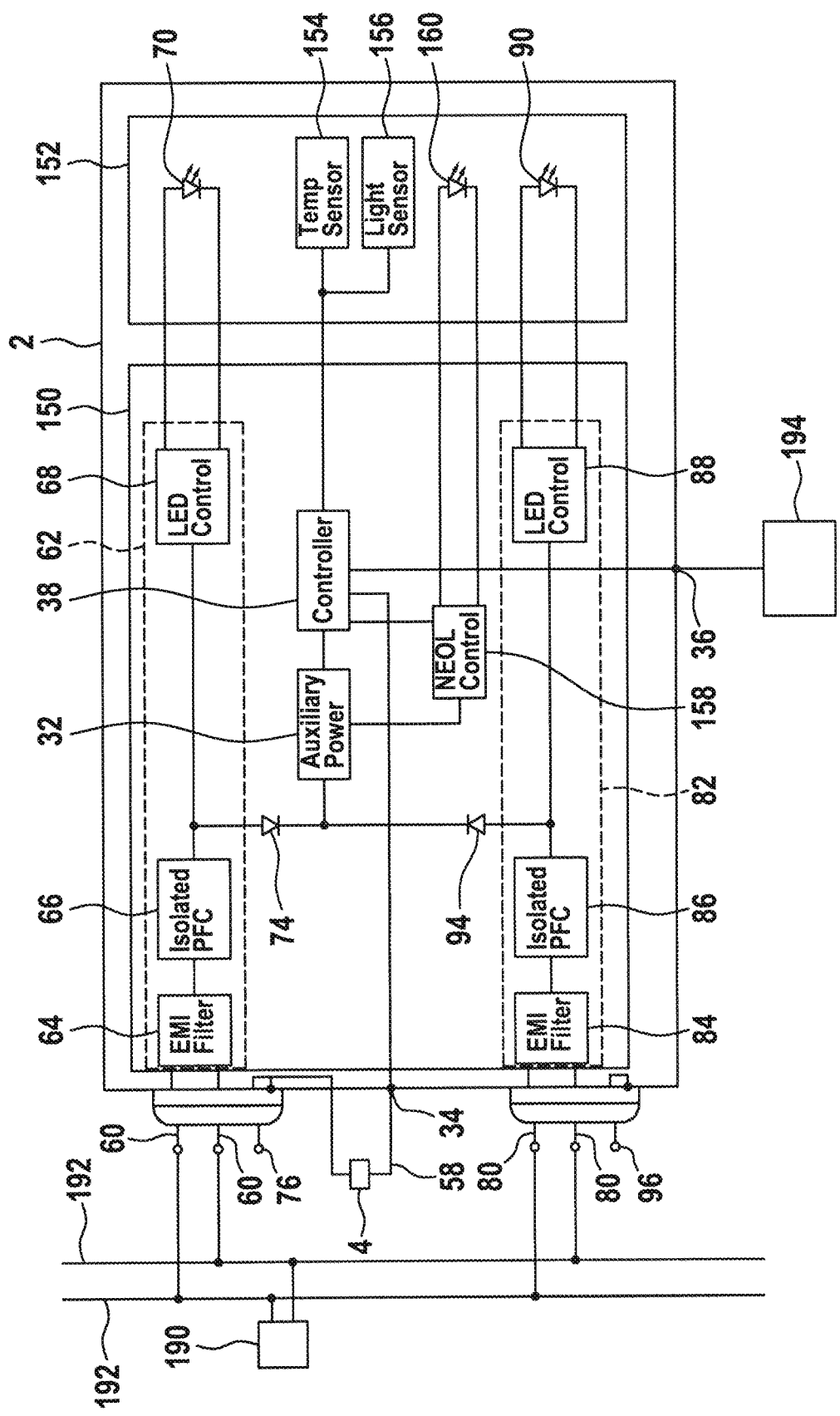
FIG. 5 shows a combination of an aircraft navigation light and an associated exterior aircraft light in accordance with an exemplary embodiment of the invention in a block diagram.

FIG. 5 shows a combination of an aircraft navigation light 2 and a supplemental exterior aircraft light 4, coupled to the aircraft navigation light 2, in accordance with an exemplary embodiment of the invention in a block diagram.

The aircraft navigation light 2 comprises a first power input 60, which consists of two AC power input terminals in the exemplary embodiment of FIG. 5. The aircraft navigation light 2 further comprises a first ground terminal 76, which is internally coupled to the housing of the aircraft navigation light 2. The aircraft navigation light 2 further comprises a first electromagnetic interference filter 64, a first isolated power factor correction circuit 66, a first LED control circuit 68, and a first navigation light source 70, which is a first navigation LED in the exemplary embodiment of FIG. 5. The first power input 60 is connected to the first electromagnetic interference filter 64, which in turn is connected to the first isolated power factor correction circuit 66, which in turn is connected to the first LED control circuit 68, which in turn is connected to the first navigation LED 70. The first electromagnetic interference filter 64, the first isolated power factor correction circuit 66, and the first LED control circuit 68 form a first power conditioning circuit 62, which in operation receives power from the first power input 60 and supplies power to the first navigation LED 70.

The aircraft navigation light 2 comprises a second power input 80, which consists of two AC power input terminals in the exemplary embodiment of FIG. 5. The aircraft navigation light 2 further comprises a second ground terminal 96, which is internally coupled to the housing of the aircraft navigation light 2. The aircraft navigation light 2 further comprises a second electromagnetic interference filter 84, a second isolated power factor correction circuit 86, a second LED control circuit 88, and a second navigation light source 90, which is a second navigation LED in the exemplary embodiment of FIG. 5. The second power input 80 is connected to the second electromagnetic interference filter 84, which in turn is connected to the second isolated power factor correction circuit 86, which in turn is connected to the second LED control circuit 88, which in turn is connected to the second navigation LED 90. The second electromagnetic interference filter 84, the second isolated power factor correction circuit 86, and the second LED control circuit 88 form a second power conditioning circuit 82, which in operation receives power from the second power input 80 and supplies power to the second navigation LED 90.

When the aircraft navigation light 2 is installed in an aircraft, the first power input 60 and the second power input 80 are coupled to the aircraft on-board power supply network. In FIG. 5, the aircraft on-board power supply network is schematically indicated via a power generator 190 and a pair of power supply lines 192. The aircraft on-board power supply network is a 115 V AC power supply network in the depicted exemplary embodiments.

The first power input 60, the first power conditioning circuit 62, and the first navigation LED 70 form a first navigation lighting arrangement. The second power input 80, the second power conditioning circuit 82, and the second navigation LED 90 form a second navigation lighting arrangement. The first and second navigation lighting arrangements are entirely separate, redundant navigation lighting arrangements, allowing for the light output of the first navigation LED 70 and the light output of the second navigation LED 90 to provide the navigation lighting functionality of the aircraft navigation light 2 in a redundant manner. The first navigation LED 70 and the second navigation LED 90 may be arranged right next to each other in the physical implementation of the aircraft navigation light 2, for example right next to each other underneath the lens 24, shown in FIG. 3. The first and second navigation lighting arrangements and their components may also be referred to as primary and secondary navigation lighting arrangements/primary and secondary components for indicating the redundancy they provide.

The aircraft navigation light 2 further comprises an auxiliary power supply 32. The auxiliary power supply 32 is coupled to the first power conditioning circuit 62 and the second power conditioning circuit 82 for receiving power therefrom. In particular, a connection point between the first isolated power factor correction circuit 66 and the first LED control circuit 68 is coupled to the auxiliary power supply 32 via a first diode 74, and a connection point between the second isolated power factor correction circuit 86 and the second LED control circuit 88 is coupled to the auxiliary power supply 32 via a second diode 94. In this way, uni-directional power flow connections are established, which allow for diverting power from the first power conditioning circuit 62 and from the second power conditioning circuit 82 to the auxiliary power supply 32. It is pointed out that the first and second diodes 74, 94 are optional components and that the uni-directional power flow may be implemented via other means, e.g. via suitable voltage levels and/or other directional circuit components. The auxiliary power supply 32 may instantaneously pass on the diverted power in a suitable manner and/or may have a power storage element, such as a capacitor or a rechargeable battery, for storing power received from the first and second power conditioning circuits 62, 82.

The aircraft navigation light 2 further comprises a controller 38. The controller 38 is coupled to the auxiliary power supply 32 for receiving power therefrom in operation. The aircraft navigation light 2 further comprises a temperature sensor 154 and a light sensor 156, which are coupled to the controller 38 and which provide temperature data and light intensity data to the controller 38 during operation of the aircraft navigation light 2. The temperature sensor 154 and the light sensor 156 are arranged in such a way that they can measure accurate values or at least accurate proxy values for the operating temperature and the light output intensity of the first and second navigation LEDs 70, 90.

The aircraft navigation light 2 further comprises a near end of life (NEOL) controller 158. The NEOL controller 158 is coupled to the auxiliary power supply 32 for receiving power therefrom. In case a near end of life condition is detected, which will be described below, the NEOL controller 158 can provide electric power to a NEOL indicator LED 160. The NEOL indicator LED 160 thus indicates to the environment, such as to ground personnel on an airfield, that a NEOL condition is reached.

Any one of or both of the controller 38 and the NEOL controller 158 may be configured to evaluate the temperature readings of the temperature sensor 154 and/or the light intensity readings of the light sensor 156 for determining a near end of life condition of the aircraft navigation light 2. For example, a near end of life condition may be detected, when the light output of the first navigation LED 70 and/or the second navigation LED 90 is below a preset light intensity threshold. It is also possible that a near end of life condition is detected in case the aircraft navigation light 2 is operated above a critical temperature threshold. Also, other criteria may be established for detecting a near end of life condition.

In the exemplary embodiment of FIG. 5, the first power conditioning circuit 62, the first diode 74, the second power conditioning circuit 82, the second diode 94, the auxiliary power supply 32, the controller 38, and the NEOL controller 158 are arranged on a first printed circuit board 150. The first navigation LED 70, the second navigation LED 90, the temperature sensor 154, the light sensor 156, and the NEOL indicator LED 160 are arranged on a second printed circuit board 152. While this embodiment allows for easily replacing the second printed circuit board 152 during maintenance, without interfering with the first printed circuit board 150, other arrangements are possible as well. For example, all components may be arranged on a single printed circuit board, such as the navigation light circuit board 22, illustrated in FIG. 3.

The aircraft navigation light 2 further comprises a power supply output 34 and a status signal input 36. The controller 38 is coupled to both the power supply output 34 and the status signal input 36.

When the aircraft navigation light 2 is installed in an aircraft, the power supply output 34 may be coupled to a supplemental exterior aircraft light 4 via a power line 58. In operation, the controller 38 may pass on power from the auxiliary power supply 32 to the supplemental exterior aircraft light 4 via the power supply output 34 and the power line 58. In this way, the aircraft navigation light 2 works as a local power supply to the supplemental exterior aircraft light 4. The supplemental exterior aircraft light 4 may provide additional lighting functionality, without having to draw power directly from the aircraft on-board power supply network. In the exemplary embodiment of FIG. 5, a DC current path is established from the controller 38 via the power supply output 34 through the supplemental exterior aircraft light 4 to the housing of the aircraft navigation light 2, working as a ground terminal. The supplemental exterior aircraft light 4 may be an exterior aircraft image protector, such as described with respect to FIGS. 1-4, or another kind of additional exterior aircraft light.

When the aircraft navigation light 2 is installed in an aircraft, the status signal input 36 may be coupled to a component of the anti-collision lighting system of the aircraft. In particular, the status signal input 36 may be coupled to a white flashing strobe light of the anti-collision lighting system or to a red flashing beacon light of the anti-collision lighting system or to any kind of command or sync line of the anti-collision lighting system. In FIG. 5, the anti-collision lighting system is schematically illustrated by box 194. Irrespective of which component the status signal input 36 is coupled to, it is coupled to the anti-collision lighting system of the aircraft in such a way that it can receive information about the operational status of the anti-collision lighting system of the aircraft. The information about the operational status of the anti-collision lighting system of the aircraft is thus available to the controller 38, which can control the power flow to the power supply output 34 in accordance with said information. In case the aircraft navigation light 2 is a combined aircraft navigation and anti-collision light, such as described with respect to FIG. 3, the status signal input 36 may be an internal terminal for receiving information about the status of the anti-collision lighting portion of the combined aircraft navigation and anti-collision light.

In the exemplary embodiment of FIG. 5, the controller 38 is configured to selectively enable power flow to the power supply output 34, i.e. to the exterior aircraft light 4. In other words, the controller 38 is configured to decide at which times power is provided to the power supply output 34 and, thus, to the exterior aircraft light 4.

In the exemplary embodiment of FIG. 5, the controller 38 is configured to selectively enable power flow to the power supply output 34 on the basis of the operational status of the aircraft navigation light 2 and the operational status of the anti-collision lighting system of the aircraft. In particular, the controller 38 deduces from the reception of power at the auxiliary power supply 32 from the first power conditioning circuit 62 or from the second power conditioning circuit 82 whether the first navigation lighting arrangement and/or the second navigation lighting arrangement are operational. In other words, the controller 38 deduces whether the aircraft navigation light 2 is on at a particular moment in time. Further in particular, the controller 38 receives information via the status signal input 36 if the red flashing beacon lights of the anti-collision lighting systems are on and/or if the white flashing strobe lights of the anti-collision lighting system are on. In case the information about both the red flashing beacon lights and the white flashing strobe lights is received, the status signal input 36 may be a multi-channel input or may be operated in accordance with a suitable protocol for conveying both pieces of information.

In the exemplary embodiment of FIG. 5, the controller 38 is configured to provide power to the power supply output 34, in case the aircraft navigation light 2 is on and the red flashing beacon lights of the anti-collision lighting system are on and/or in case the aircraft navigation light 2 is on and the white flashing strobe lights of the anti-collision lighting system are off. Each one of said two conditions is considered a good indication that the aircraft is on the ground. On the basis of this determination, power flow to the supplemental exterior aircraft light 4 is enabled in the exemplary embodiment of FIG. 5. In case the supplemental exterior aircraft light 4 is configured to illuminate a ground portion below the aircraft, such as in case the supplemental exterior aircraft light is an exterior aircraft image protector for illuminating a ground portion below the aircraft, the determination of the aircraft being on the ground allows for effectively projecting an image onto the ground below the aircraft, without wasting power, when the aircraft is in the air, and/or without disturbing other pilots and ground personnel by the output of the exterior aircraft image protector, when the aircraft is in the air.

Depending on the available information and depending on the purpose of the supplemental exterior aircraft light 4, the controller 38 may implement other decision routines for selectively enabling power flow to the power supply output. For example, when the aircraft navigation light 2 is on and the white flashing strobe lights of the anti-collision lighting system are on, it can be determined that the aircraft is in the air and power supply may be effected to an exterior aircraft light 4 that is intended to be operated when airborne. Also, the controller 38 may detect changes in the operational status of the aircraft navigation light 2 and/or in the status of the anti-collision lighting system. Such changes in operational status, potentially accompanied by timer operations, triggered by said changes in operational status, may also be used for deciding whether or not to provide power flow to the power supply output 34.

It is further possible that the aircraft navigation light 2 has two power supply outputs, coupled to the auxiliary power supply 32 directly or via the controller 38, in order to separately provide power flow to two additional exterior aircraft lights. It is further also possible to couple two exterior aircraft lights to a single power supply output 34, either in series or in parallel.

The power supply output 34 may be rated to provide between 1 W and 20 W, in particular between 5 W and 10 W, of electrical power.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. A combination comprising:
   an aircraft navigation light, comprising:
   a navigation lighting arrangement, comprising:
      a power input, coupleable to an aircraft on-board power supply network,
      at least one navigation light source, and
      a power conditioning circuit, coupled between the power input and the at least one navigation light source for conditioning a power flow from the power input to the at least one navigation light source;
   an auxiliary power supply, coupled to the power conditioning circuit for diverting power from the navigation lighting arrangement; and
   a power supply output, coupled to the auxiliary power supply, for supplying power from the auxiliary power supply to an exterior aircraft light, external to the aircraft navigation light;
   and
   a supplemental exterior aircraft light,
   wherein the aircraft navigation light and the supplemental exterior aircraft light are separate light units,
   wherein the supplemental exterior aircraft light is coupled to the power supply output of the aircraft navigation light for receiving power from the auxiliary power supply of the aircraft navigation light, and
   wherein the supplemental exterior aircraft light is an exterior aircraft image projector, configured to be installed on an aircraft for projecting an image onto at least one of a ground portion below the aircraft and an exterior surface portion of the aircraft.

2. The combination according to claim 1, wherein the auxiliary power supply of the aircraft navigation light is galvanically isolated from the power input of the navigation lighting arrangement.

3. The combination according to claim 1, wherein the power supply output of the aircraft navigation light is coupled to the auxiliary power supply via a controller and wherein the controller is configured to selectively enable power flow from the auxiliary power supply to the power supply output.

4. The combination according to claim 3, wherein the controller is configured to control power flow from the auxiliary power supply to the power supply output depending on an operational status of the navigation lighting arrangement.

5. The combination according to claim 3, wherein the aircraft navigation light further comprises:
   a status signal input for receiving information about an operational status of an anti-collision lighting system of the aircraft, wherein the controller is configured to selectively enable power flow from the auxiliary power supply to the power supply output depending on the operational status of the anti-collision lighting system of the aircraft.

6. The combination according to claim 5, wherein the controller is configured to supply power at the power supply output when at least one of the following conditions is met:
   red flashing beacon lights of the anti-collision lighting system are on;
   white flashing strobe lights of the anti-collision lighting system are off;
   red flashing beacon lights and white flashing strobe lights of the anti-collision lighting system are off.

7. The combination according claim 3, further comprising:
   at least one of a temperature sensor and a light output sensor,
   wherein the controller is coupled to said at least one of the temperature sensor and the light output sensor and configured to monitor the operation of the at least one navigation light source via said at least one of the temperature sensor and the light output sensor.

8. The combination according to claim 1, wherein the aircraft navigation light further comprises:
   a second navigation lighting arrangement, comprising:
      a second power input, coupleable to the aircraft on-board power supply network,
      at least one second navigation light source, and
      a second power conditioning circuit, coupled between the second power input and the at least one second navigation light source for conditioning a power flow from the second power input to the at least one second navigation light source;
   wherein the auxiliary power supply is coupled to the second power conditioning circuit for diverting power from the second navigation lighting arrangement.

9. The combination according to claim 1, wherein the aircraft navigation light is a right wing tip aircraft navigation light or a left wing tip aircraft navigation light.

10. An aircraft comprising:
    the combination recited in claim 1,
    wherein the aircraft is an air plane and wherein said combination is installed in a wing tip region of the air plane.

11. A method of operating an aircraft navigation light and an exterior aircraft image projector, installed in an aircraft adjacent to each other, the method comprising:
    with the aircraft navigation light, receiving power from an aircraft on-board power supply network;
    with the aircraft navigation light, providing power to at least one navigation light source of the aircraft navigation light;
    with the aircraft navigation light, providing power at a power supply output of the aircraft navigation light;
    with the exterior aircraft image projector, receiving power from the power supply output of the aircraft navigation light; and
    with the exterior aircraft image projector, illuminating least one of a ground portion below the aircraft and an exterior surface portion of the aircraft in response to receiving power from the aircraft navigation light.

12. The method according to claim 11, comprising:
    evaluating an operational status of an anti-collision lighting system of the aircraft;
    deriving from the operational status of the anti-collision lighting system of the aircraft whether the aircraft is on the ground; and
    selectively illuminating said at least one of a ground portion below the aircraft and an exterior surface portion of the aircraft, depending on the operational status of the anti-collision lighting system of the aircraft.

* * * * *